April 28, 1942.   F. E. MOSKOVICS ET AL   2,280,836
BLADE SUPPORT FOR SHAVING DEVICES
Filed March 4, 1940
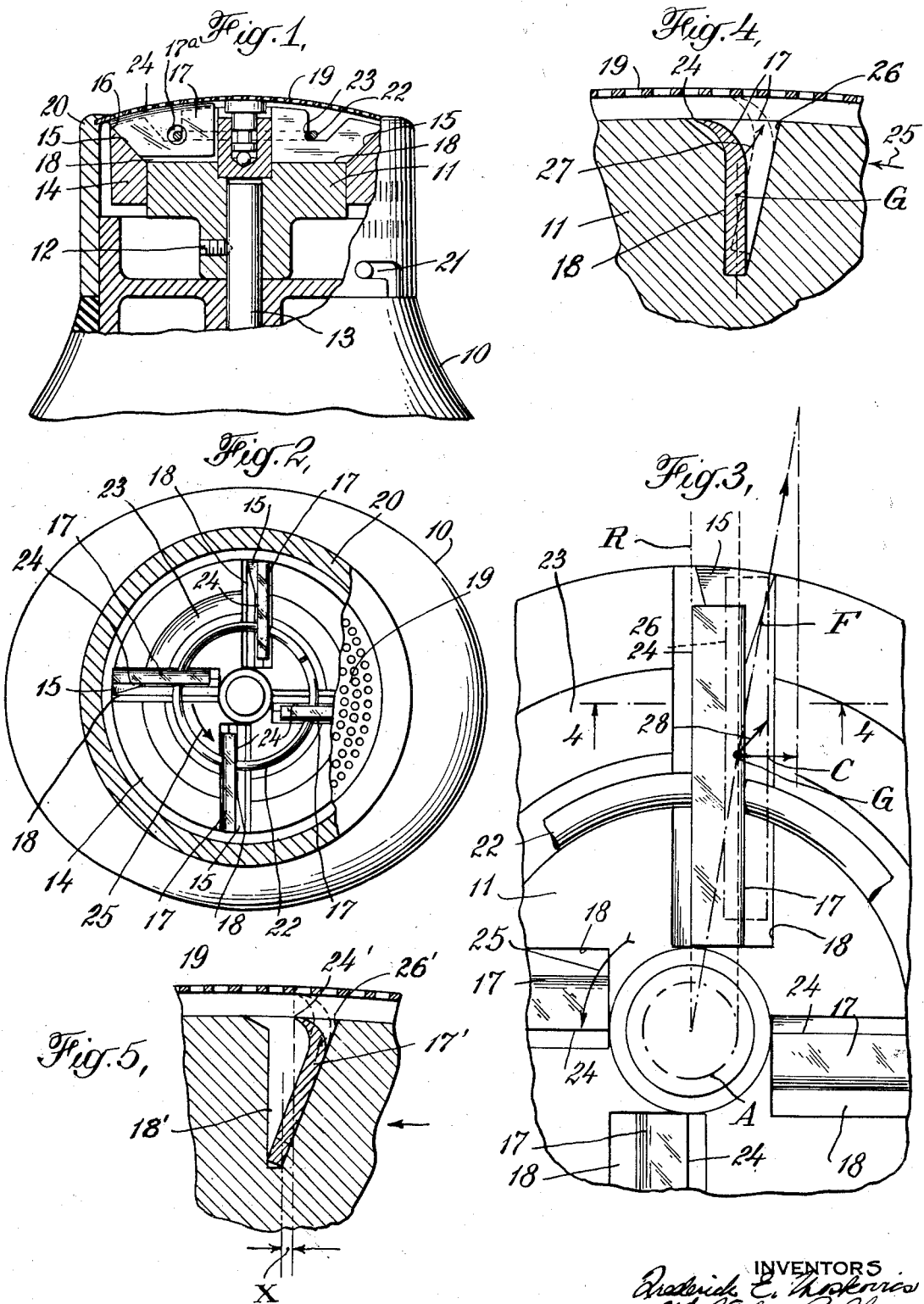
INVENTORS
Frederick E. Moskovics
and Victor R. Abrams
BY
Hoguet, Neave & Campbell
ATTORNEYS Patented Apr. 28, 1942

2,280,836

UNITED STATES PATENT OFFICE 2,280,836

BLADE SUPPORT FOR SHAVING DEVICES

Frederick E. Moskovics, Greenwich, Conn., and Victor R. Abrams, Maplewood, N. J., assignors, by direct and mesne assignments, to Eleanor U. Andrews, Greenwich, Conn.

Application March 4, 1940, Serial No. 322,050

5 Claims. (Cl. 30—43)

This invention relates to shaving devices and has particular reference to arrangements for supporting and actuating relatively free or floating blades in cooperative shearing relation with the under surface of the shear plate of the device during operation of the same.

The invention is concerned with improvements in the shaving device disclosed in our Patent No. 2,119,021, issued May 31, 1938, in which a blade support having radial slots loosely containing blades rotates at high speed beneath a perforated shear plate and the blades and corresponding slots in the blade support are so arranged as to cause the blades to be urged radially and axially against the under surface of the shear plate by a combined centrifugal force and cam action during operation of the device.

In our copending application Serial No. 226,410, filed August 24, 1938, there are disclosed various forms of blades for use in the shaving device disclosed in the aforementioned patent and other similar devices, these blades being in general characterized by having at least one sharpened edge which is directed in the direction of movement of the blade for cooperating with the shear plate to sever the hairs projected therethrough by a form of slicing action as compared to the shearing action provided by the relatively dull-edged blades of hair and beard clippers, for example. In cases where single edge blades are employed, or blades which have no means for holding their shearing edges in proper shearing relation with the shear plate, the manufacture of the device must be very precise and accurate, particularly in respect to the shape of the blades and the cooperating blade support, for if there is any inaccuracy the blades do not always properly engage the shear plate with the sharp edge, but may engage the shear plate behind the edge with consequent imperfect cutting and sometimes pulling of the hairs.

In accordance with the present invention, the blade and its blade support are so arranged that under all conditions of operation the sharp edge of the blade is constantly presented in intimate wiping contact with the under surface of the shear plate to provide not only the most effective cutting action but also to assure a continued sharpening of the edge by a sort of lapping action to compensate for the dulling tendency of the shaving operation.

More particularly, the kinetic force of rotation of the shaving device is preferably utilized to properly position the blade with its cutting edge in intimate wiping contact with the under surface of the shear plate, this being accomplished in a preferred form of the invention by tilting the blade in a direction contrary to the direction of rotation of the blade support so that the leading edge of the blade is positioned at a greater angle with respect to the under surface of the shear plate to assure the proper wiping relation therewith. This tilt-back effect is preferably obtained by properly relating the support of the blade to the center of gravity thereof so that the tendency of this relationship is to unbalance the blade to secure the bias in the proper direction.

It will be seen that with this arrangement a more perfect and more reliable cutting action is provided for not only the rotary type of shaving device described in said aforementioned patent but other floating blade types of shaving apparatus.

For a more complete understanding of the invention, reference may be had to the accompanying drawing, in which:

Figure 1 is a side view of the cutting head of a shaving device embodying the present invention shown partly in axial section and partly broken away to disclose the structure of the cutting mechanism;

Fig. 2 is a top view of the device with the shear plate partly broken away to disclose the structure of the cutting mechanism;

Fig. 3 is an enlarged plan view of a blade and a part of the blade support, and illustrates the two positions of the blade;

Fig. 4 is a section therethrough as seen along the line 4—4 of Fig. 3; and

Fig. 5 is a similar section showing a modified form of blade support.

In Figs. 1 and 2 of the drawing is disclosed a shaving device of the type described more particularly in said copending application. This shaving device consists of a handle 10 in which is mounted an electric motor, not shown, for actuating a supporting or cutter member 11, which is fixed by means of a set screw 12 to the upper end of the shaft 13 of the motor. The cutter member 11 is provided with a rim 14 having a conical inner surface 15 against which bear the inclined edges 16 of a plurality of blades 17. The blades 17 are received in slots 18 in the cutter member 11 and are capable of axial as well as radial movement during rotation of the cutter member 11, whereby engagement of the inclined edges of the blades 17 with the conical surface 15 will cause the cutting edges of the blades to move into intimate engagement with the under surface of a shear plate 19. The shear plate 19 is of dome or convex shape and is supported at its periphery in a collar 20 which is detachably connected to the upper end of the handle by means of pin and bayonet slot connections 21. The blades are retained on the supporting member 11 by means of a spring ring 22 which is received in an undercut groove 23 formed in the upper surface of the supporting member 11 and is received loosely in the aperture 17a in each of the blades 17.

Upon rotation of the supporting member 11, the centrifugal force generated urges the blades 17 radially outwardly and upwardly because of the engagement of the edge portion 16 with the conical surface 15, thereby forcing the edges of the blades against the under surface of the shear plate 19 in shearing relationship.

Instead of being precisely radially arranged as disclosed in said application, the slots 18 in the rotating blade support are arranged so that their center lines are tangent to a circle A, as is illustrated in enlarged Fig. 3. Also the slots 18 are preferably V-shaped, as shown in the enlarged section of Fig. 4. The blades 17 loosely rest in the corresponding slots 18 and are generally inverted L-shaped in cross-section, being formed, for example, by bending a strip of steel at one edge and then sharpening it to a razor-like edge 24, which is directed in the direction of rotation designated by the arrow 25 in Figs. 2, 3 and 4.

When the device is at rest, the center of gravity G of the blade 17 is accordingly back of the radius R extending parallel to the general longitudinal axis of the blade, as shown in Fig. 3. Consequently, as the blade support 11 is rotated in the direction of arrow 25, the component C of the centrifugal force F acting through the center of gravity G of the blade 17 causes the latter to be tilted backwardly from the solid line position shown in Fig. 4 against the sloping rear face 26 of the slot 18, i. e., in a direction opposite to the direction of rotation.

At the same time, the centrifugal force and the cam action of conical surface 15 causes the blade to be moved radially outwardly and axially upwardly in the general manner described in said aforementioned patent. The arrow 27 in Fig. 4 generally designates this movement and the arrow 28 in Fig. 3 also generally designates this movement as seen in plan. Thus, the blade 17 is moved from the position shown in solid lines to the dotted line position in Fig. 4, with its sharp cutting edge tilted and urged into wiping engagement with the under surface of the shear plate 19 for cooperation with the perforations therein to sever hairs projected therethrough.

The blade 17 is accordingly always maintained in the proper cutting relation with the shear plate 19 and since the edge 24 thereof intimately engages the under surface of the shear plate 19, it is maintained sharp by a sort of a lapping action therewith to compensate for the dulling effect of the shaving operation. Since only the extreme edge 24 of the blade so engages the shear plate the sharpening action is relatively rapid and thus keeps pace with the dulling effect of the shaving operation. Also, by reason of this precise relationship between the blade edge 24 and the shear plate, the cutting is perfect and there is no pulling, as would be the case if the edge of the blade were backed off slightly from the cooperating surface of the shear plate, due to the manufacturing irregularities or the like, under ordinary conditions. When the rotation of the blade support 11 is stopped the blade drops back to the bottom of slot 18 into the general central position illustrated in Fig. 4.

In the modification illustrated in Fig. 5, which may be used in precisely radially arranged slots, as illustrated in said aforementioned patent and application, the inertia of the blade causes the blade to tilt backwardly until it is overbalanced sufficiently to fall and remain against the sloping surface 26' of the slot 18', so that when the blade moves upwardly as indicated by the arrow, it is already tilted back. In this form the edge 24' of the blade 17' lies behind its lower corner on which the blade rests when tilted back against 26', by the amount X, as shown in Fig. 5. Obviously the blade of Fig. 5 may be used instead of the blade shown in Fig. 4 in which the blade edge 24 extends further forwardly in the direction of rotation from the body of the blade than does the edge 24' in the form shown in Fig. 5, whereby advantages of both modifications may be employed.

While two forms kinetically in unbalanced blades are shown, other adaptations of the same inventive thought lie within the scope of the invention, as well as modifications in structure thereof, as defined by the appended claims.

We claim:

1. In a shaving device, the combination of an apertured shear plate, a rotary blade support behind said plate having a substantially radial slot of generally V-shaped transverse cross-section, a blade loosely mounted in said slot having a cutting edge directed in the direction of rotation of said support and adapted to cooperate with the under side of said shear plate to sever hairs projected through the apertures therein, said blade being tiltable in said slot in a direction opposite to the direction of movement thereof to decrease the angle between the edge of said blade and the under side of said shear plate during rotation of said support.

2. In a shaving device, the combination of an apertured shear plate, a rotary blade support behind said plate having a substantially radial slot therein defined by walls converging relatively toward the bottom of said slot, and a blade loosely mounted in said slot having a cutting edge directed in the direction of rotation of said support and adapted to cooperate with the under side of said shear plate to sever hairs projected through the apertures therein, said blade being tiltable in said slot in a direction opposite to the direction of movement thereof against the corresponding wall of said slot to decrease the angle between the edge of said blade and the under side of said shear plate during rotation of said support.

3. In a shaving device, the combination of an apertured shear plate, a rotary blade support behind said plate having a substantially radial slot with a wall thereof inclined with respect to the axis of rotation of said blade support, means for rotating said holder in one direction, a blade loosely mounted in said slot having a cutting edge directed in the direction of rotation of said support and adapted to cooperate with the under side of said shear plate to sever hairs projected through the apertures therein, said blade being tiltable in said slot in response to rotation thereof in a direction opposite to the direction of movement thereof against the corresponding wall of said slot to decrease the angle between the edge of said blade and the under side of said shear plate during rotation of said support.

4. In a shaving device, the combination of an apertured shear plate, a rotary blade support behind said plate having a substantially radial slot of a generally V-shaped transverse cross-section, a blade loosely mounted in said slot having a cutting edge directed in the direction of rotation of said support and adapted to cooperate with the under side of said shear plate to sever hairs projected through the apertures therein, and means responsive to rotation of said support for urging said blade against the under side of said shear plate, said blade being tiltable in said slot in a direction opposite to the direction of movement thereof to decrease the angle between the edge of said blade and the under side of said shear plate during rotation of said support.

5. In a shaving device, the combination of an apertured shear plate, a rotary blade support behind said plate having a substantially radial slot of generally V-shaped transverse cross-section and with its inner end positioned behind the radial line through its outer end, and a blade loosely mounted in said slot having a cutting edge directed in the direction of rotation of said support and adapted to cooperate with the under side of said shear plate to sever hairs projected therethrough, the force of rotation and the inclination of said slot causing the blade to be tilted in a direction opposite to the direction of movement thereof to decrease the angle between the edge of said blade and the under side of said shear plate.

FREDERICK E. MOSKOVICS.
VICTOR R. ABRAMS.